(12) United States Patent
Coughlan et al.

(10) Patent No.: US 10,022,824 B2
(45) Date of Patent: Jul. 17, 2018

(54) NICKEL-IRON-PHOSPHORUS BRAZING ALLOYS

(71) Applicant: Metglas, Inc., Conway, SC (US)

(72) Inventors: William Coughlan, Myrtle Beach, SC (US); Eric Theisen, Myrtle Beach, SC (US)

(73) Assignee: Metglas, Inc., Conway, SC (US)

( * ) Notice: Subject to any disclaimer, the term of this patent is extended or adjusted under 35 U.S.C. 154(b) by 0 days.

(21) Appl. No.: 14/218,452

(22) Filed: Mar. 18, 2014

(65) Prior Publication Data

US 2015/0266139 A1 Sep. 24, 2015

(51) Int. Cl.
*B21C 37/00* (2006.01)
*B23K 35/30* (2006.01)
*B23K 1/00* (2006.01)
*B23K 1/008* (2006.01)
*B23K 35/02* (2006.01)
*C22C 19/05* (2006.01)
*C22C 30/00* (2006.01)
*F28F 21/08* (2006.01)
*C22C 45/00* (2006.01)

(52) U.S. Cl.
CPC .......... *B23K 35/3033* (2013.01); *B23K 1/008* (2013.01); *B23K 1/0012* (2013.01); *B23K 35/0233* (2013.01); *C22C 19/053* (2013.01); *C22C 19/056* (2013.01); *C22C 30/00* (2013.01); *C22C 45/00* (2013.01); *F28F 21/089* (2013.01); *B32B 2250/03* (2013.01); *B32B 2307/30* (2013.01); *B32B 2307/702* (2013.01); *B32B 2307/714* (2013.01); *B32B 2605/00* (2013.01); *Y10T 428/12431* (2015.01); *Y10T 428/12438* (2015.01); *Y10T 428/12944* (2015.01); *Y10T 428/12951* (2015.01)

(58) Field of Classification Search
None
See application file for complete search history.

(56) References Cited

U.S. PATENT DOCUMENTS 3,986,867 A 10/1976 Masumoto et al.
4,142,571 A 3/1979 Narasimhan
(Continued)

FOREIGN PATENT DOCUMENTS

WO WO 2008/060226 A2 5/2008

OTHER PUBLICATIONS

Rabinkin, Anatol, "Brazing with amorphous foil preforms", Jun. 2001, Advanced Materials & Processes, pp. 1-3.*
(Continued)

*Primary Examiner* — Seth Dumbris
(74) *Attorney, Agent, or Firm* — Crowell & Moring LLP

(57) ABSTRACT

Disclosed is a semi-amorphous, ductile brazing foil with a composition consisting essentially of $Ni_{bal}Fe_aCr_bP_cSi_dB_e\text{-}Mo_f$ with approximately 30 atomic percent$\le a \le$approximately 38 atomic percent; approximately 10 atomic percent$\le b \le$approximately 20 atomic percent; approximately 7 atomic percent$\le c \le$approximately 20 atomic percent; approximately 2 atomic percent$\le d \le$approximately 4 atomic percent; e$\le$approximately 2 atomic percent; f$\le$approximately 5 atomic percent; and the balance being Ni and other impurities; where c+d+e<approximately 16 atomic percent.

7 Claims, 5 Drawing Sheets

(56) References Cited

U.S. PATENT DOCUMENTS

| | | | |
|---|---|---|---|
| 4,144,058 | A | 3/1979 | Chen et al. |
| 4,745,037 | A | 5/1988 | DeCristofaro et al. |
| 7,392,930 | B2 * | 7/2008 | Rangaswamy .... B23K 35/0244 228/183 |
| 7,455,811 | B2 * | 11/2008 | Sjodin ................ B23K 35/3086 148/403 |
| 2009/0130483 | A1 | 5/2009 | Hartmann et al. |
| 2010/0028716 | A1 | 2/2010 | Nuetzel et al. |
| 2010/0300148 | A1 | 12/2010 | Demetriou et al. |
| 2011/0020166 | A1 * | 1/2011 | Otobe .................. B23K 35/02 420/51 |
| 2012/0286025 | A1 * | 11/2012 | Sawada ............. B23K 35/3033 228/56.3 |

OTHER PUBLICATIONS

ASM International, "Chapter 6 Diffusion Brazing", 2005, Principles of Brazing, pp. 1-10.*

International Search Report (PCT/ISA/210), including Written Opinion (PCT/ISA/237) dated Jun. 25, 2015 (eleven (11) pages).
International Preliminary Report on Patentability (PCT/IB/373) issued in PCT Application No. PCT/US2015/020251 dated Sep. 20, 2016, including Written Opinion (PCT/ISA/237) previously filed on Jul. 27, 2015 (Six (6) pages).
Rabinkin, "Overview: Brazing With (NiCoCr)-B-Si Amorphous Brazing Filler Metals: Alloys, Processing, Joint Structure, Properties, Applications", Science and Technology of Welding and Joining, Jun. 2004, pp. 1-40.
Theisen et al., "Invited Lecture: Recent Developments in Amorphous Brazing Foil", 2014 International Conference of Brazing, Soldering and Special Joining Technologies, Jun. 9-13, 2014, pp. 120-124.
Kay, "Brazing Furnaces:Vacuum vs. Continuous-Belt", Vac Aero International Inc., Dec. 7, 2015, https://vacaero.com/information-resources/vacuwn-brazing-with-dan-kay/1471-brazing-funaces-vacuum-vs-continuous-belt.html (four (4) pages).
AWS C3 Committee on Brazing and Soldering "Furnace Brazing", AWS Brazing Handbook, Chapter 14, 2007, pp. 276 and 277.
Extended European Search Report issued in counterpart European Application No. 15764430.3 dated Oct. 17, 2017 (8 pages).

* cited by examiner

NICKEL-IRON-PHOSPHORUS BRAZING ALLOYS

BACKGROUND OF THE INVENTION

1. Field of the Invention

The invention relates to brazing filler metals having nickel-iron-based alloys containing transition metals such as chromium and molybdenum and certain metalloids. The alloys include one or more of nickel, chromium, iron, molybdenum, boron, phosphorus, and silicon, and are particularly useful for brazing metals at lower temperatures than the prior art. These alloys are typically less costly than nickel-based alloys and can reduce nickel leaching in potable water applications.

2. Description of the Prior Art

Atomized brazing powders disclosed in the prior art, with high iron concentration and with phosphorus as the major melting temperature depressant, requires a binder to keep the powder in place. This binder has to be "burned off" during the brazing cycle, which creates hydrocarbon build-up on the interior of the furnace. This mix of binder and powder typically outgases during the brazing cycle, making it more likely to trap gas pockets in the brazed object.

Prior art iron-containing brazing foils have high concentrations of metalloids such as boron and phosphorous, which create brittle intermetallics in the brazed joints. These intermetallics are typically chromium borides or chromium phosphides. Because of the brittleness of the brazed joints, the joints often crack, resulting in disintegration of the brazed products.

Brazing of nickel-iron based alloys disclosed in the prior art is restricted to a vacuum-type oven because of the high temperatures that are required during brazing operation, combined with the need for protective atmospheres. The vacuum brazing process is extremely slow and expensive as compared to a belt/continuous furnace. However, brazing temperatures of powder and other brazing foils are too high for belt oven, which is typically limited to 1100° C.

SUMMARY OF THE INVENTION

An embodiment of the present invention is directed to a homogeneous, ductile brazing foil. The foil includes Ni, Fe, Cr, P, and Si and may also include one or more of B and Mo. In a preferred embodiment, the composition of the foil may be expressed as $Ni_{bal}Fe_aCr_bP_cSi_dB_eMo_f$ with approximately 30 atomic percent≤a≤approximately 38 atomic percent; approximately 10 atomic percent≤b≤approximately 20 atomic percent; approximately 7 atomic percent≤c≤approximately 20 atomic percent; approximately 2 atomic percent≤d≤4 atomic percent; e≤approximately 2 atomic percent; f≤5 approximately atomic percent, and the balance being Ni and other impurities; where c+d+e<approximately 16 atomic percent.

The foil can be placed on the material to be brazed via resistance welding or friction requiring no binder, and the brazing process can be completed without any additional processing.

The content of the metalloids B, P, and Si is preferably optimized to simultaneously (1) depress the melting point, (2) keep the metalloid concentration as low as possible to reduce brittle intermetallics, and (3) maintain a recommended brazing temperature below approximately 1100° C.

The iron content of the ductile brazing foil may be increased in order to create a ductile Ni—Fe—Cr—P matrix in the braze joint after brazing.

The preferred brazing temperature of the alloy of the present invention is below 1100° C. so that processing can be accomplished in a belt/continuous furnace; however, any suitable brazing temperature may be used. Brazing in such a furnace may help reduce processing costs as well as preventing excessive thermal stresses in the brazed product.

BRIEF DESCRIPTION OF THE DRAWINGS

The invention will be more fully understood and further advantages will become apparent when reference is made to the following detailed description of the embodiments and the accompanying drawing in which.

DETAILED DESCRIPTION OF THE EMBODIMENTS

Figure 1:
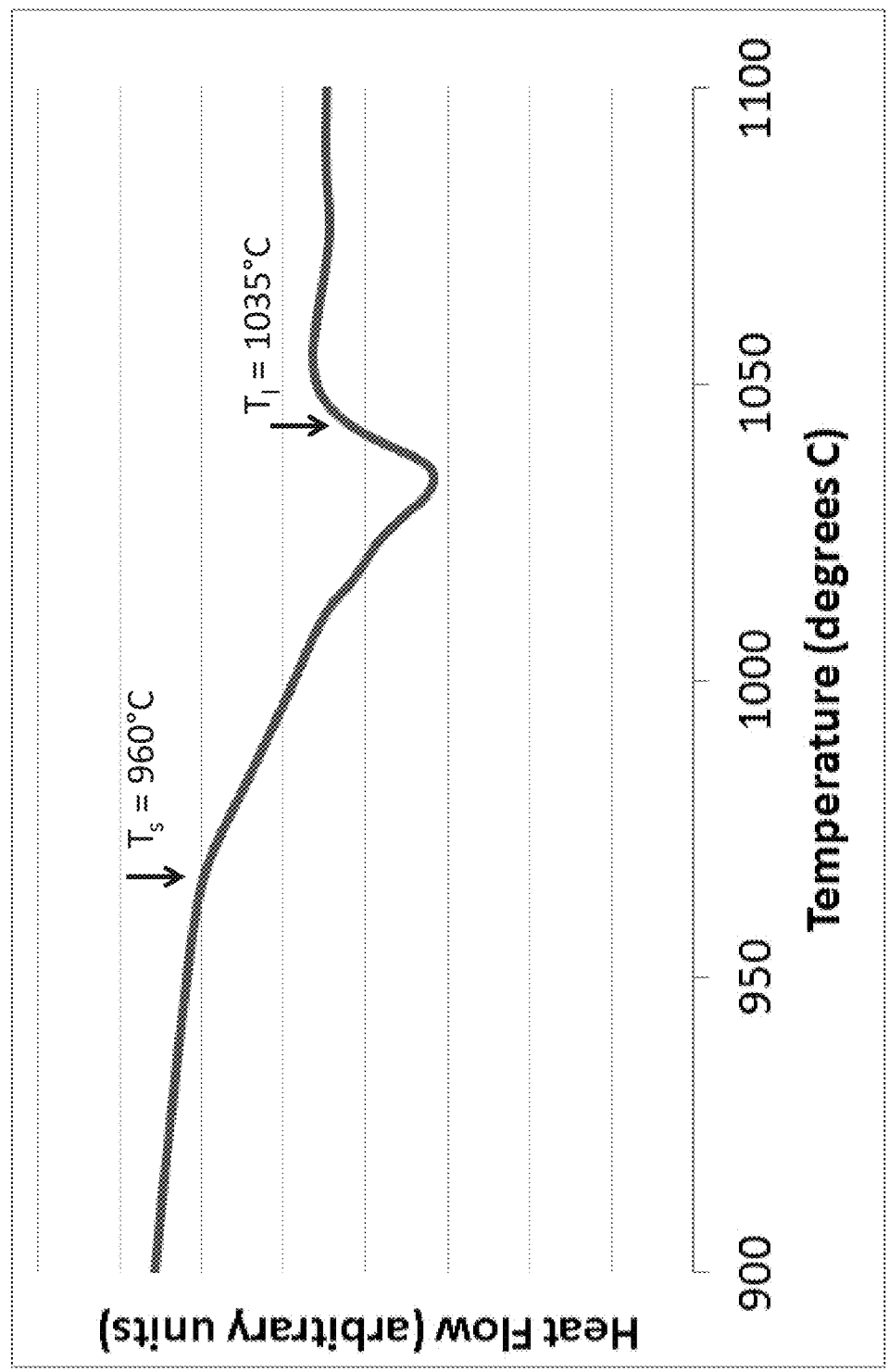
FIG. 1 illustrates a differential thermal analysis (DTA) scan with temperature on the horizontal axis and heat on the vertical axis. $T_s$ and $T_l$ represent the solidus and liquidus temperature, respectively. The alloy ribbon on which the DTA scan was made is Alloy 1 of Table 1.

The invention consists of a ductile brazing foil that is produced via melt spinning according to the method described in U.S. Pat. No. 4,142,571, the contents of which are incorporated by reference herein in their entirety. Melt spinning consists of a mass of molten metal being quenched onto a spinning wheel at a rate of $10^{6°}$ C. per second in order to form a metastable glassy structure. This results in the invention having an amorphous or semi-amorphous structure giving the invention the ability to be cast very thin (in a preferred range of approximately 25-38 µm thick) and in a continuous, fully homogenized ribbon form.

The ability of the foil to be cast in very thin, continuous ribbon form allows production of heat exchangers and other plate-fin type applications to join thin stainless steel sheets together. The benefit of utilizing thin stainless steel sheets in heat exchanger applications is that, for the end user, more media are separated, increasing the exposed surface area, by a larger concentration of channels. "This increases the total thermal efficiency of the heat exchanger. However, care must be taken when brazing thin stainless steel sheets due to possible erosion that could occur during brazing, reducing the total thickness of the stainless steel sheets. An advantage of a preferred embodiment is to cast small thickness to reduce the prevalence of erosion during brazing." The thinner sheet also allows the application to reduce weight, which saves cost and increases full economy, if used, e.g., in an automotive-type heat exchanger.

The invention is amorphous or semi-amorphous, ductile brazing foil made from Ni, Fe, Cr, P, and Si and may also include one or more of B and Mo. In a preferred embodiment, the composition of the foil may be expressed as $Ni_{bal}Fe_aCr_bP_cSi_dB_eMo_f$ with approximately 30 atomic percent≤a≤approximately 38 atomic percent; approximately 10 atomic percent≤b≤approximately 20 atomic percent; approximately 7 atomic percent≤c≤approximately 20 atomic percent; approximately 2 atomic percent≤d≤approximately 4 atomic percent; e≤approximately 2 atomic percent; f≤approximately 5 atomic percent; and the balance being Ni and other impurities; where c+d+e<approximately 16 atomic percent.

In a preferred embodiment, the concentration of iron is from about 30 atomic percent to about 38 atomic percent. This concentration reduces the cost of the alloys versus Ni—Cr—P alloys and reduces the overall Nickel content to reduce Nickel leaching in potable water applications.

In this preferred embodiment, the concentration of chromium is about 10 atomic percent to about 20 atomic percent. This concentration improves corrosion resistance.

The concentration of metalloids is preferably optimized to be able to produce an amorphous or semi-amorphous foil and allow processing on a belt/continuous furnace. Two examples of this preferred embodiment have the chemical compositions given in Table I below.

In Alloy 1 and 2 the concentration of boron is 2 atomic percent to allow processing of the brazing foil on the same manufacturing lines of Ni—Cr—B—Si alloys. Other suitable concentrations of boron outside those selected for Alloy 1 and Alloy 2 can, of course, be used.

In this preferred embodiment, phosphorus, which is the major melting temperature depressant, has a concentration between about 9 atomic percent and about 11 atomic percent. This drops the melting temperature of the alloy 31° C. per atomic percent.

In this preferred embodiment, the silicon atomic concentration range is between about 2 atomic percent and about 4 atomic percent, which increases ease of the material's fabrication into amorphous states during foil production and also acts as a melting temperature depressant.

In this preferred embodiment, total metalloid content (boron plus phosphorus plus silicon) is less than about 16 atomic percent. This percent is less than the total found in prior art and acts to minimize the potential for brittle intermetallics to be formed during the brazing process.

In this preferred embodiment, molybdenum is in the range from 0 to about 1 percent, 1 atomic weight percent is added to help increase corrosion resistance and solubility with 316 stainless steel alloys. Other suitable concentrations of molybdenum can, of course, be used.

Figure 4:
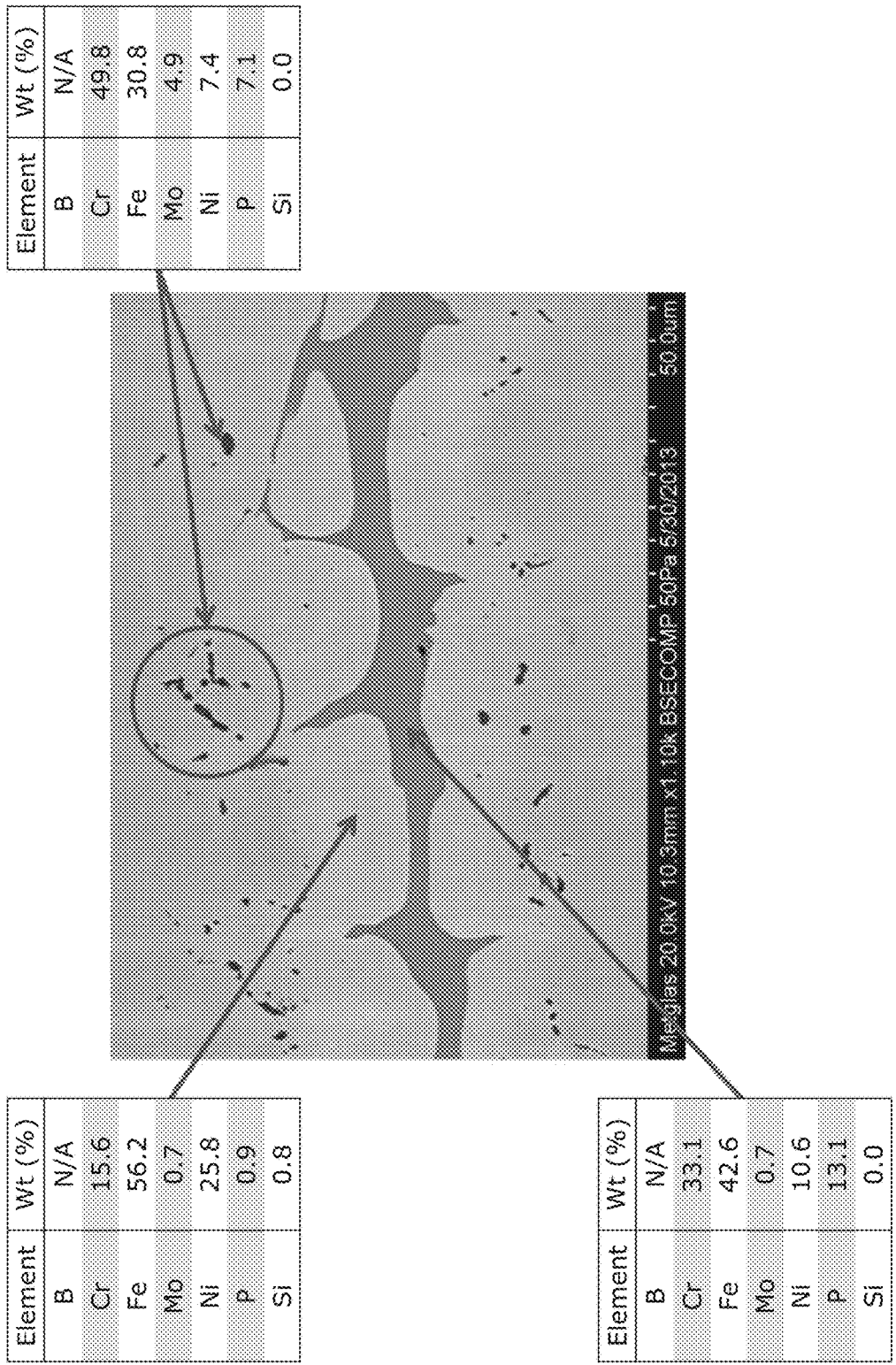
FIG. 4 illustrates an optical microscope image of the local structure in the brazed section between the stainless steel sheets of FIG. 3. The chemical compositions in the representative sections are given in the boxes shown.

Alloys of this preferred embodiment were cast according to the teaching of U.S. Pat. No. 4,142,571 and were utilized as brazing foils as described in Example 1. The brazed section between two stainless steel sheets had metallurgical phases shown in FIG. 4, showing chromium-borides accumulated in the phosphorous-rich phase.

Figure 5:
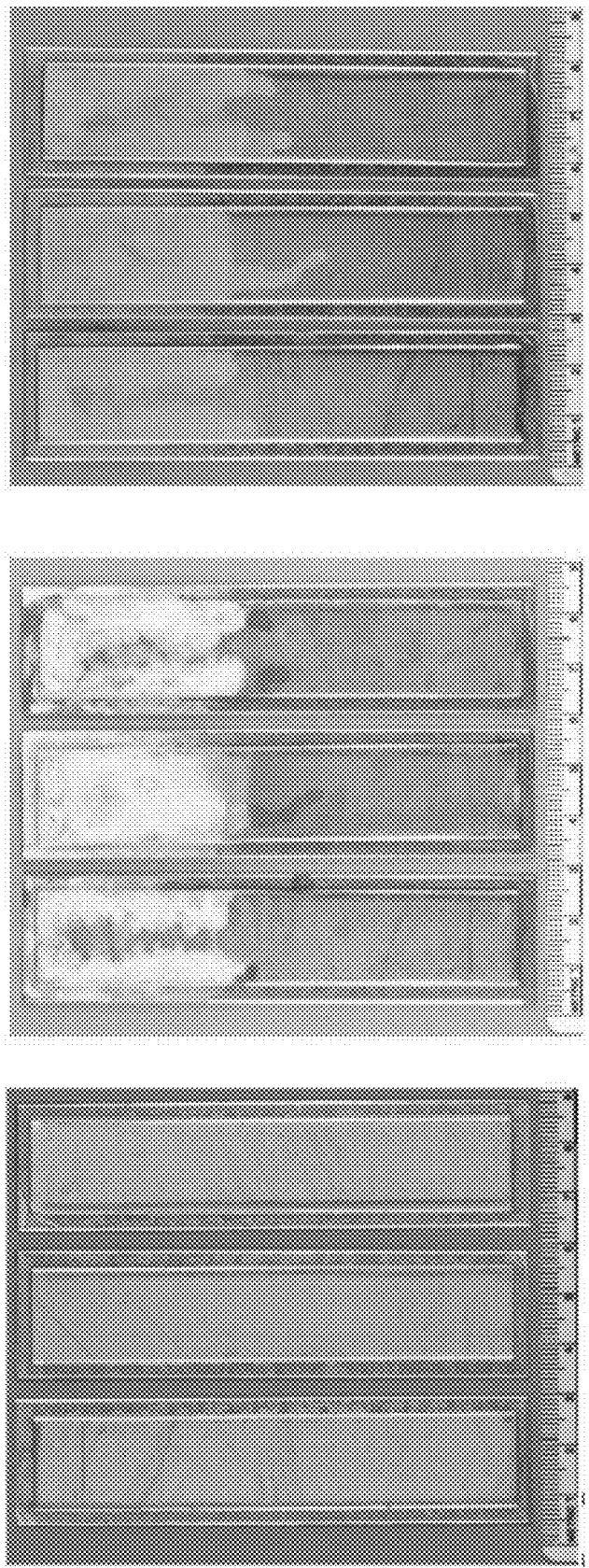
FIG. 5 illustrates optical microscope images of the surfaces of (a) as-prepared specimens, (b) specimens after a corrosion test, and (c) specimens cleaned after the corrosion test.

Corrosion testing of the brazed section of Example 1 was conducted as described in Example II. The results are illustrated in FIG. 5, indicating the tests passed the criteria set forth in the industrial standards adopted in the automotive industries.

Example 1

Figure 2:
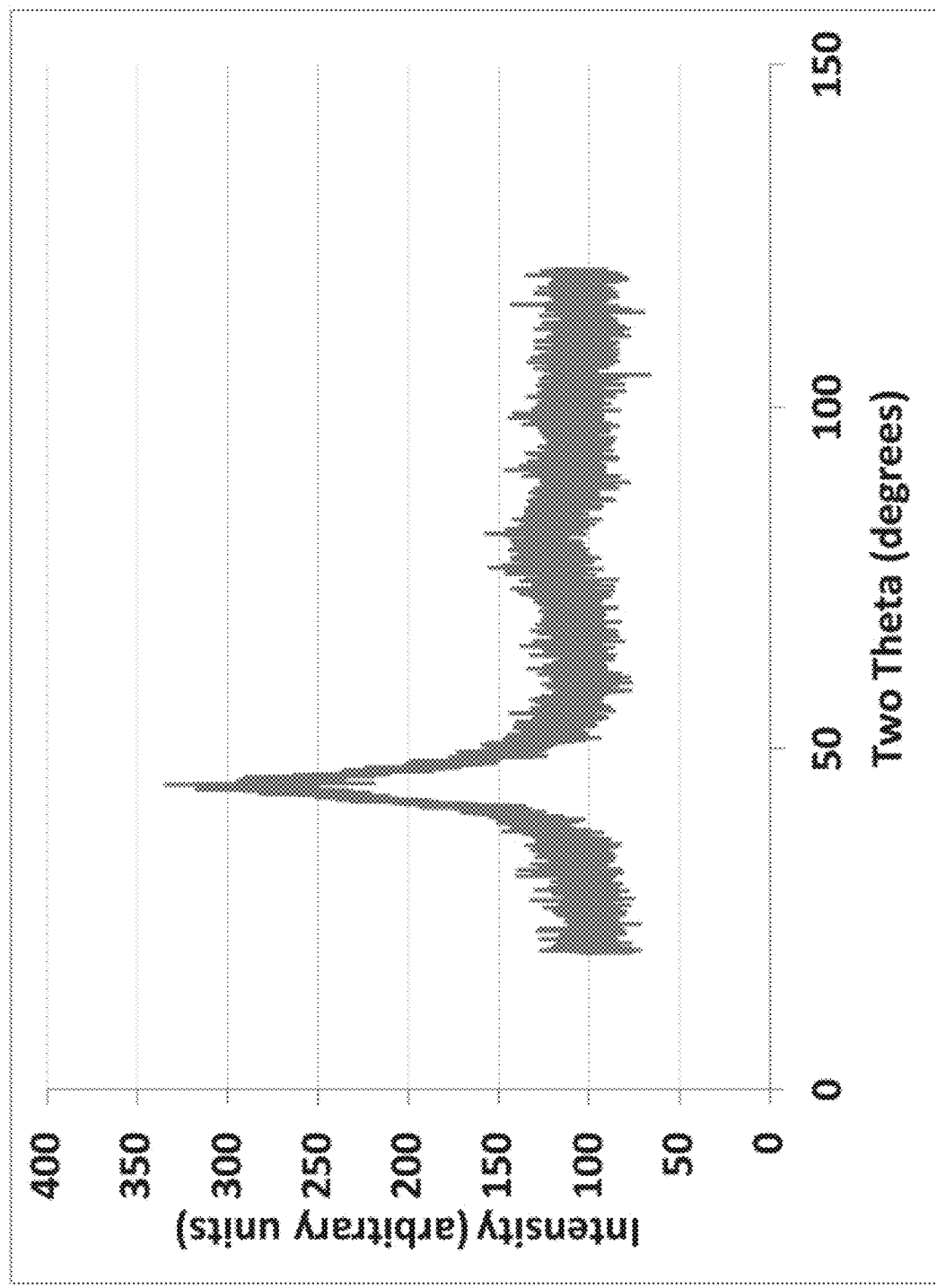
FIG. 2 illustrates an X-ray diffraction (XRD) scan with X-ray angle on the horizontal axis and X-ray intensity on the vertical axis taken on Alloy 1 of Table 1. The scan shows a small crystalline peak at about Two Theta of 44.8 degrees on a broad amorphous diffraction pattern, indicating that Alloy 1 is semi-amorphous containing less than a few percent crystalline phase in the fully amorphous matrix.
Figure 3:
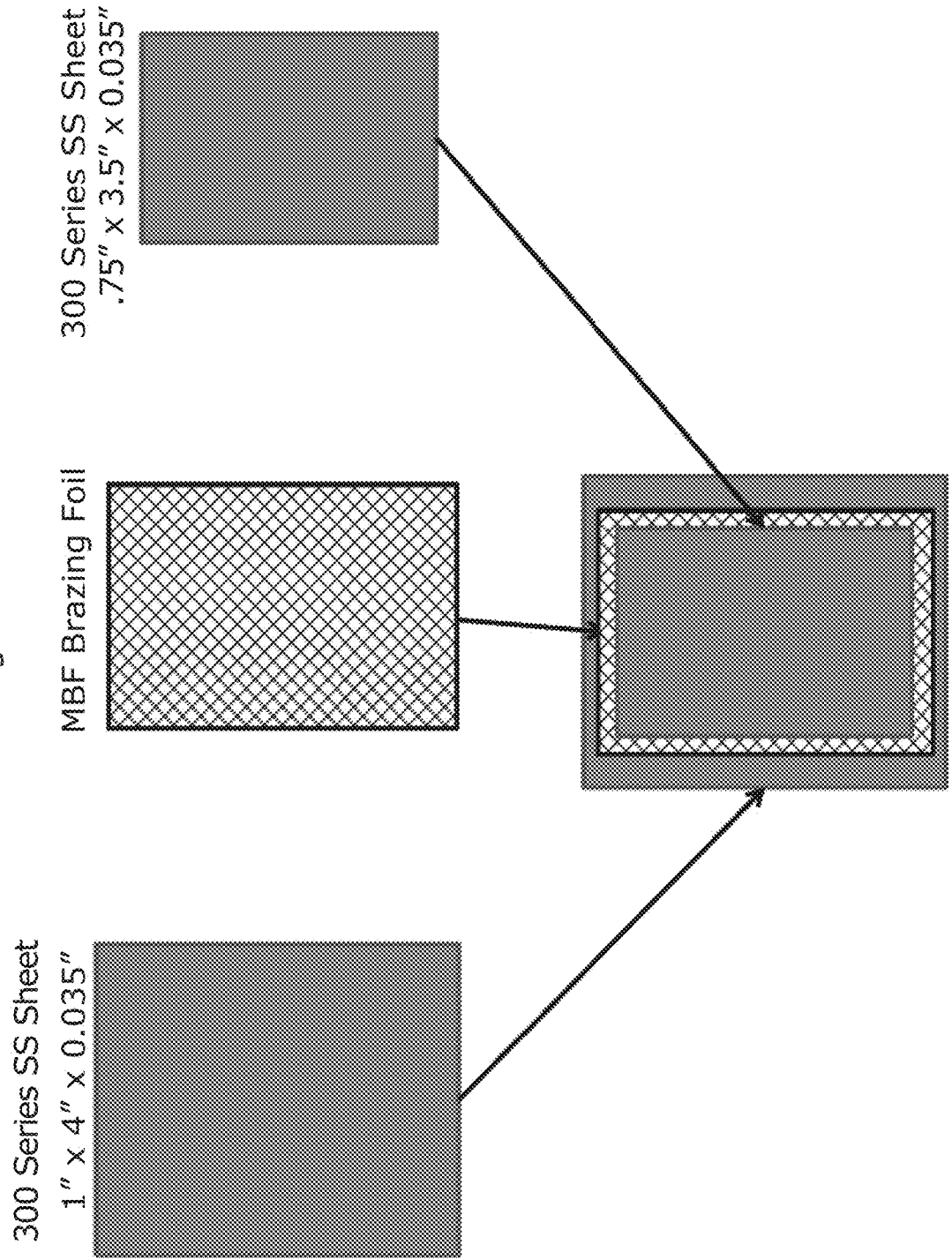
FIG. 3 illustrates a brazing foil of an embodiment of the invention sandwiched with two stainless steel sheets

A DTA on an amorphous alloy ribbon having a composition of $Ni_{38}Fe_{30}Cr_{16}B_2P_{10}Si_3$ (numbers in atomic percent) was made by a conventional Differential Thermal Analyzer to determine alloy's solidus ($T_s$) and liquidus ($T_l$) temperatures. They were found to be $T_s$=960° C. and $T_l$=1030° C., which were used to determine the optimal brazing temperature. The DTA scan is shown in FIG. 1. An XRD scan reveals that the ribbon is semi-amorphous (FIG. 2) in the as-cast state. A brazing foil having the composition of $Ni_{38}Fe_{30}Cr_{16}B_2P_{10}Si_3$ was placed between two 300 series stainless steel sheets with dimensions of 2.5 cm×10.0 cm×0.09 cm and 1.9 cm×8.9 cm×0.09 cm as shown in FIG. 3 and was brazed at a brazing temperature of 1060° C., with a holding time of 15-20 minutes after being heated to the first and second dwell temperatures of 260° C., with a holding time of 20-45 minutes and 960° C. with a holding time of 20-45 minutes. A conventional metallography was used to identify the metallurgical phases appearing in the brazed section between the two stainless steel sheets and an example is shown in FIG. 4, indicating that chromium-borides accumulated in the phosphorous-rich phase.

Example 2

The brazements of Example 1 were cleared with soap and water and solvent degreased with a final rinse in acetone. These cleaned brazements were weighed on an analytical balance to the nearest 0.0001 g, overall measurements of length, width, and thickness of each brazement were made using a caliper with resolution of 0.01 mm. The reagent for corrosion testing was prepared based on the concentration in Table II.

TABLE I

Chemical composition examples of the disclosed brazing foil. The solidus and liquidus temperatures determined by DTA of Example 1 are given for each composition.

| Alloy | Ni (At %) | Fe (At %) | Cr (At %) | B (At %) | P (At %) | Si (At %) | Other (At %) | Solidus (° C.) | Liquidus (° C.) |
|---|---|---|---|---|---|---|---|---|---|
| 1 | balance | 30 | 16 | 2 | 10 | 3 | 1 Mo | 960 | 1030 |
| 2 | balance | 33 | 11 | 2 | 10 | 3 | 1 Mo | 910 | 1020 |

TABLE II

| Test solution reagent and concentration | | |
|---|---|---|
| Test Solution | Concentration (ppm) | Solution pH |
| $Cl^-$ | 100 | 8.0 ± 0.2 |
| $NO_3^-$ | 20 | |
| $SO_3^{2-}$ | 600 | |
| $SO_4^{2-}$ | 600 | |
| $CH_3COO^1$ | 800 | |

Three brazements of Example 1 were corrosion tested following Method B of JASO (Japan Automotive Standards Organization) M611-92E Standard for internal corrosion test method for automotive muffler and three brazements were left unexposed as control specimens. The Method B is a cyclic test and one cycle consists of 5 and 24 hour immersions in an oven at 80° C. followed by a cool down to room temperature and reagent change. After these five immersions, a sixth immersion was completed in an oven at 250° C. for 24 hours. Four total cycles were completed, which equates to exposure at 80° C. for 480 hours and 250° C. for 96 hours. Once the required cycles were completed the brazements were removed and photographed. Loose deposits were removed according to the JASO M611, Section 7.2.2, using a solution of 60% nitric acid at 80° C. for 2 hours, rinsed with d-ionized water and dried. The samples then were weighed on the same analytical balance and overall measurements of length, width, and thickness were repeated. The results were recorded from the JASO M611-92E requirements, each one of each specimen was cross-sectioned, polished and viewed under an optical microscope at 75× and 150× magnification. Some of the results are illustrated in FIGS. 5a, 5b and 5c, where FIG. 5a illustrates the front face of a brazed specimen, FIG. 5b illustrates the specimen surface after exposure to solution reagent, and FIG. 5c illustrates the specimen surface after surface being cleaned.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brazing foil of an amorphous or semi-amorphous alloy consisting essentially of $Ni_{bal}Fe_aCr_bP_cSi_dB_eMo_f$ with 30 atomic percent≤a≤38 atomic percent; 10 atomic percent≤b≤20 atomic percent; 7 atomic percent≤c≤10 atomic percent; 2 atomic percent≤d≤4 atomic percent; e≤2 atomic percent; f≤5 atomic percent; and the balance being Ni and other impurities; where c+d+e<16 atomic percent, wherein the alloy is brazed at a temperature of less than 1100° C.

2. The foil of claim 1, wherein 9 atomic percent≤c≤10 atomic percent and f≤1 atomic percent.

3. A brazed metal device, comprising:
a first metal component;
a brazing foil; and
a second metal component;
wherein the brazing foil consists essentially of $Ni_{bal}Fe_aCr_bP_cSi_dB_eMo_f$ with 30 atomic percent≤a≤38 atomic percent; 10 atomic percent≤b≤20 atomic percent; 7 atomic percent≤c≤10 atomic percent; 2 atomic percent≤d≤4 atomic percent; e≤2 atomic percent; f≤5 atomic percent; and the balance being Ni and other impurities; where c+d+e<16 atomic percent, wherein the brazing foil and the first and second metal components are brazed at a temperature less than 1100° C.

4. A method of manufacturing a brazed metal device, comprising:
placing the brazing foil of claim 1 between first and second metal components; and
heating the brazing foil and first and second metal components in a belt furnace.

5. The method of claim 4, wherein the furnace temperature is below 1100° C.

6. A brazed metallic component, comprising:
a first sheet of metal;
a brazing foil; and
a second sheet of metal;
wherein the brazing foil consists essentially of $Ni_{bal}Fe_aCr_bP_cSi_dB_eMo_f$ with 30 atomic percent≤a≤38 atomic percent; 10 atomic percent≤b≤20 atomic percent; 7 atomic percent≤c≤10 atomic percent; 2 atomic percent≤d≤4 atomic percent; e≤2 atomic percent; f≤5 atomic percent; and the balance being Ni and other impurities; where c+d+e<16 atomic percent, wherein the brazing foil and the first and second sheets of metal are brazed at a temperature less than 1100° C.

7. A heat exchanger comprising:
a first sheet of metal;
a brazing foil; and
a second sheet of metal;
wherein the brazing foil consists essentially of $Ni_{bal}Fe_aCr_bP_cSi_dB_eMo_f$ with 30 atomic percent≤a≤38 atomic percent; 10 atomic percent≤b≤20 atomic percent; 7 atomic percent≤c≤10 atomic percent; 2 atomic percent≤d≤4 atomic percent; e≤2 atomic percent; f≤5 atomic percent; and the balance being Ni and other impurities; where c+d+e<16 atomic percent, wherein the brazing foil and the first and second sheets of metal are brazed at a temperature less than 1100° C.

* * * * *